Patented Nov. 14, 1922.

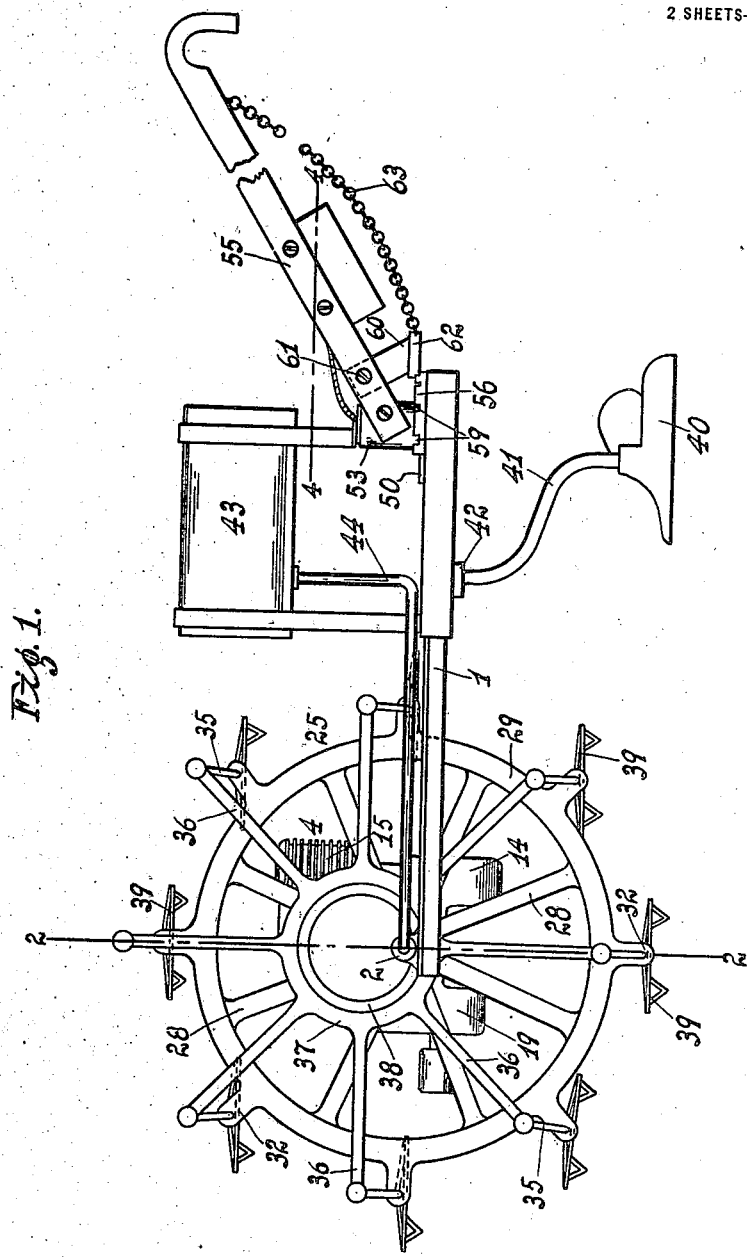

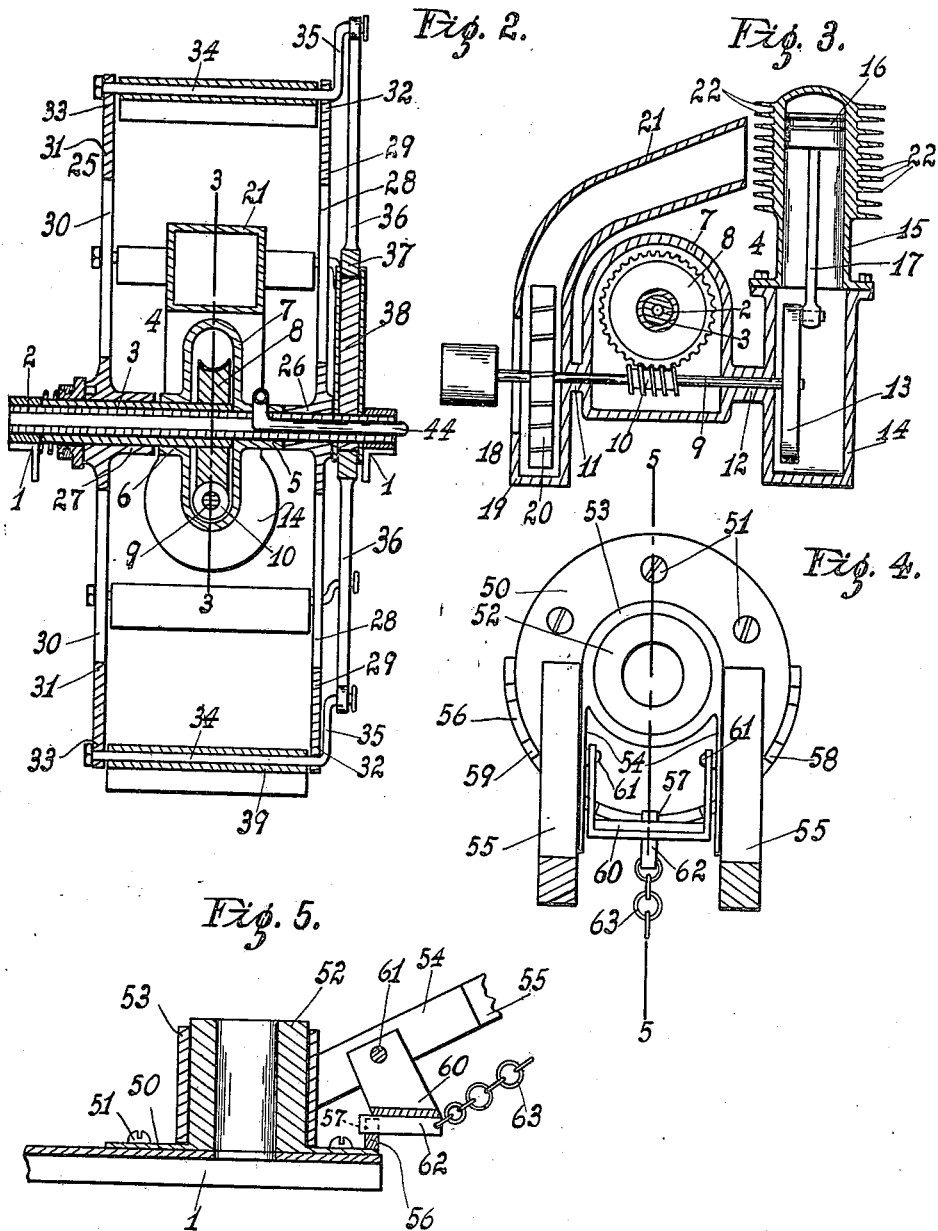

1,435,222

UNITED STATES PATENT OFFICE.

WILLIAM R. FREMERSDORF, OF HAYWARD, CALIFORNIA.

HAND TRACTOR.

Application filed January 25, 1921. Serial No. 439,755.

*To all whom it may concern:*

Be it known that I, WILLIAM R. FREMERSDORF, a citizen of Australia, residing at Hayward, in the county of Alameda and State of California, have invented certain new and useful Improvements in Hand Tractors, of which the following is a specification.

My invention is a tractor hand plow, the plow handles of which are pivoted to be turned horizontally out of the way so that the plow may turn sharp corners, particularly those which are fenced in.

Referring to the annexed drawings in which my invention is illustrated and which form a part of this specification, Figure 1 is a side elevation of a tractor hand plow embodying my invention.

Figure 2 is a transverse vertical section of the plow taken on line 2—2 of Figure 1.

Figure 3 is a longitudinal section of the tractor engine and transmission taken on line 3—3 of Figure 2.

Figure 4 is a horizontal section taken on line 4—4 of Figure 1 showing the pivot mounting of the plow handles.

Figure 5 is a vertical section taken on line 5—5 of Figure 4.

In the drawings 1 indicates a horizontal frame on the forward end of which is mounted a transverse stationary hollow shaft 2. A sleeve 3 is journaled on the shaft 2. A gas engine 4 is mounted on the shaft 2 and sleeve 3, the engine casing having formed thereon sleeves 5 and 6 which respectively surround said shaft and sleeve 3, the sleeve 5 being secured to the shaft and the sleeve 3 turning in the sleeve 6. The engine casing includes a hood, 7 integral with and between the sleeves 5 and 6, within which hood a worm gear 8 is secured on the inner end of the sleeve 3, and through the lower end of said hood a shaft 9 extends longitudinally of the plow, on which shaft is secured a worm 10 in mesh with worm gear 8, the shaft 9 being journaled in bearings 11 and 12 on the engine casing in the front and rear of hood 7. A crank disk 13 is secured on the rear end of shaft 9 within the engine crank case 14 which is integral with the rear end of bearing 12. The engine cylinder 15 is mounted on the crank case 14 in which cylinder reciprocates the piston 16 and the piston rod 17 is connected to the crank disk 13. Forwardly of the hood 7 is mounted a fan 18 including a casing 19 and a fan wheel 20, said casing being formed on the forward end of the bearing 11 and said fan wheel being secured on the shaft 9 within said casing. From the fan casing 19 extends an air nozzle 21 to the forward side of the engine cylinder cooling fins 22. A traction wheel 25 is journaled on the shaft 2 by means of its hubs 26 and 27, the hub 26 being journaled on the shaft and the hub 27 being secured on the sleeve 3. From the hub 26 project spokes 28 which support a rim 29. From the hub 27 project spokes 30 which support a rim 31. On the rim 29 are bearings 32 and on the rim 31 are bearings 33. A plurality of transverse shafts 34 are respectively journaled at one end in bearings 32 and at the other end in opposite bearings 33. On one end of the shafts 34 are cranks 35 to which are connected the outer end of rods 36 which project radially from an eccentric ring 37 surrounding an eccentric 38 secured to one end of shaft 2. On the shafts 34 are secured grousers 39 which are caused to approach the ground in a horizontal position by the eccentric 38, ring 37, rods 36 and cranks 35. A plow blade 40 is swivelly mounted on the rear of the frame 1, said blade being secured to the lower end of a rod 41 which is swiveled at its upper end in a bearing 42 secured to the under side of said frame. A gasoline tank 43 is mounted on the rear of the frame 1 above the frame, a tube 44 leading from said tank through the hollow shaft 2 and connecting to the engine carbureter.

Upon the rear of the frame 1 a circular plate 50 is secured by means of screws 51 on which plate is formed an upstanding hollow journal 52. A ring 53 surrounds the journal 52 and turns thereon, and from opposite sides of said ring arms 54 extend rearwardly and upwardly at an angle, to which arms are secured the lower end of plow handles 55 which may be turned to the right or left with the ring 53 on the journal 52. On the rear half of the periphery of plate 50 is an upstanding flange 56, in the upper edge of which are notches 57, 58 and 59, the notch 57 being in the center of the flange or midway between its ends, and the notches 58 and 59 being at the right and left of the notch 57 respectively. A U-shaped latch frame 60 is pivoted at its ends at 61 to the inside of arms 54 and a latch 62 is secured to the intermediate member of said frame 61 for engaging the notches 57, 58 or 59. A chain 63 is secured at its lower end to the rear end of latch 62 and at its upper end to the upper part of the plow handles 55.

When the latch 62 engages notch 57 it holds the plow handles straight or longitudinally with relation to the implement, and when the latch engages the notches 58 or 59 it holds the plow handles turned to the right or left.

When the implement comes to a corner the operator pulls the chain 63 which disengages the latch 62 from notch 57, and then turns the handles 55 to the right or left according to the way the implement is going and then releases the chain so that the latch engages a notch 58 or 59 and holds the handles turned to the right or left so that the implement may turn a sharp corner. When the corner is turned the operator pulls the chain 63 and releases the latch from the notch 58 or 59 and then turns the handles 55 back straight and releases the chain and allows the latch to drop back into notch 57 and hold the handles straight.

Having described my invention, I claim:

1. In a tractor hand plow, a journal on the rear of the implement, a ring turnable on said journal, plow handles secured to said ring, an arcuate flange on the rear of the implement provided with notches, and a latch for engaging said notches to lock the plow handles against swinging movement.

2. In a tractor hand plow, a journal on the rear of the implement, a ring turnable on said journal, plow handles secured to said ring, an arcuate flange on the rear of the implement provided with notches, a latch for engaging said notches to lock the plow handles against swinging movement, and a chain connected to said latch and the plow handles for withdrawing said latch from said notches.

In testimony whereof I affix my signature.

WILLIAM R. FREMERSDORF.